United States Patent
Imatoh

(10) Patent No.: US 11,741,999 B2
(45) Date of Patent: Aug. 29, 2023

(54) VIDEO PROCESSING DEVICE, VIDEO FREEZING DETERMINATION METHOD AND DISPLAY SYSTEM

(71) Applicant: LAPIS Technology Co., Ltd., Yokohama (JP)

(72) Inventor: Yuki Imatoh, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 17/521,982

(22) Filed: Nov. 9, 2021

(65) Prior Publication Data

US 2022/0148625 A1    May 12, 2022

(30) Foreign Application Priority Data

Nov. 11, 2020   (JP) .................................. 2020-187933

(51) Int. Cl.
  *G11B 27/36*   (2006.01)
  *H04N 17/00*   (2006.01)

(52) U.S. Cl.
  CPC ............. *G11B 27/36* (2013.01); *H04N 17/00* (2013.01)

(58) Field of Classification Search
  CPC ........ G11B 27/36; H04N 17/00; H04N 17/04; H04N 7/183; G06T 15/04
  USPC ....................................................... 386/263
  See application file for complete search history.

(56) References Cited

U.S. PATENT DOCUMENTS

| | | | | |
|---|---|---|---|---|
| 8,340,502 B2 * | 12/2012 | Higeta | ................... | H04N 5/911 |
| | | | | 396/404 |
| 8,503,451 B2 * | 8/2013 | Mallory | .................. | H04L 47/34 |
| | | | | 370/473 |
| 8,867,611 B2 * | 10/2014 | Huang | ............... | H04N 21/2343 |
| | | | | 375/240.26 |
| 9,113,148 B2 * | 8/2015 | Chida | ................ | G01B 11/2513 |
| 9,538,220 B2 * | 1/2017 | ElArabawy | ............. | H04L 65/80 |
| 10,771,818 B2 * | 9/2020 | Amer | .................. | H04N 21/6375 |
| 10,904,310 B2 * | 1/2021 | Han | ....................... | H04L 1/0002 |
| 2021/0302724 A1 * | 9/2021 | Imatoh | ................... | B60K 35/00 |
| 2022/0319464 A1 * | 10/2022 | Obara | .................... | G09G 5/006 |

FOREIGN PATENT DOCUMENTS

| | | |
|---|---|---|
| JP | 2016-039508 A | 3/2016 |
| JP | 2018-079839 A | 5/2018 |

* cited by examiner

*Primary Examiner* — Helen Shibru

(74) *Attorney, Agent, or Firm* — Rabin & Berdo, P.C.

(57) ABSTRACT

A video processing device includes: a frame number generating unit that generates frame numbers representing respective frames to which successively supplied video data belongs, the frame numbers differing between one frame and a next frame; a writing unit that writes a data block including a piece of the video data and the frame number corresponding thereto in a frame memory for every frame; a reading unit that reads out the data block written in the frame memory in the order of frames; and a video freezing determination unit that generates an abnormality determination signal that indicates video freezing when a current value of the frame number of the data block read stays the same as a previous value over a prescribed number of times.

9 Claims, 7 Drawing Sheets

VIDEO PROCESSING DEVICE, VIDEO FREEZING DETERMINATION METHOD AND DISPLAY SYSTEM

CROSS REFERENCE TO RELATED APPLICATION

This application is based upon and claims the benefit of priority of the prior Japanese Patent Application No. 2020-187933, filed on Nov. 11, 2020, the entire contents of which are incorporated herein by reference.

TECHNICAL FIELD

The present invention relates to a video processing device that writes/reads video data in/from a frame memory, a video freezing determination method for the video processing device, and a display system equipped with the video processing device.

BACKGROUND ART

In a display system, a video (e.g., images) being displayed in a display of a display device might freeze. Video freezing occurs when a display does not show an image of the video represented by a video signal even though the display is driven based on the video signal representing the video, and because the image of the same frame is repeatedly displayed, a still image is shown as a result. There are various reasons for this video freezing to occur, including a malfunction of a video source such as a camera, or a malfunction of a graphics generating unit such as SOC (system on a chip), for example. Japanese Patent Application Laid-open Publication No. 2018-79839 (Patent Document 1) and Japanese Patent Application Laid-open Publication No. 2016-39508 (Patent Document 2) have proposed a method to detect such video freezing, for example.

Patent Document 1 discloses an in-vehicle display system that determines whether an image of a first region of a displayed image of a plurality of frames outputted to a display from an in-vehicle camera through a main control unit is changing or not, and if the image of the first region is determined to be not changing, the system then determines whether an image of a second region that is larger than the first region in the displayed image of the plurality of frames is changing or not, and if the image of the second region is not changing, then the system determines that the video is frozen.

Patent Document 2 discloses a display device that compares a code given to a frame of an image that is currently displayed in a display unit (display) with a code given to a frame of the previously displayed image, and if those codes match, the display device determines that a screen is frozen.

SUMMARY OF THE INVENTION

Problems to be Solved by the Invention

Conventional display systems have a video processing device that inputs video signals supplied from a video source such as a camera, writes those signals into a frame memory, and reads out the written video signals to output them to a display device. In such a video processing device, frame rate conversion is performed to adjust the reading frequency relative to the writing frequency, for example.

Also, these conventional video processing devices are known to often have a problem of video freezing where the video signal of the same frame is repeatedly read out from the frame memory even when video signals are normally supplied from the video source.

If the methods for detecting video freezing described in Patent Documents 1 and 2 were to be applied to this video freezing in the video processing device, it would not be possible to determine whether the video is frozen because of a failure in writing/reading for the frame memory in the video processing device, or because the video signal inputted into the video processing device represents a paused image.

To solve this problem, an object of the present invention is to provide a video processing device that can determine whether a video is frozen because of a failure of the video processing device itself or not, a video freezing determination method for the video processing device, and a display system equipped with the video processing device.

A video processing device of the present invention includes: a frame number generating unit that generates frame numbers representing respective frames to which successively supplied video data belongs, the frame numbers differing between one frame and a next frame; a writing unit that writes a data block including a piece of the video data and the frame number corresponding thereto in a frame memory for every frame; a reading unit that reads out the data block written in the frame memory in the order of frames; and a video freezing determination unit that generates an abnormality determination signal that indicates video freezing when a current value of the frame number of the data block read by the reading unit stays the same as a previous value over a prescribed number of times.

A video freezing determination method for a video processing device of the present invention includes: a step in which a frame number generating unit generates frame numbers representing respective frames to which successively supplied video data belongs, the frame numbers differing between one frame and a next frame; a step in which a writing unit writes a data block including a piece of the video data and the frame number corresponding thereto in a frame memory for every frame; a step in which a reading unit reads out the data block written in the frame memory in the order of frames; and a step in which a freezing determination unit that generates an abnormality determination signal that indicates video freezing when a current value of the frame number of the data block read by the reading unit stays the same as a previous value over a prescribed number of times.

A display system of the present invention includes a video processing device that writes video data successively outputted from a video source into the frame memory, and reads out the written video data from the frame memory; and a display device that presents a video based on the video data read out from the frame memory in a display, wherein the video processing device includes: a frame number generating unit that generates frame numbers representing respective frames to which successively supplied video data belongs, the frame numbers differing from one frame and a next frame; a writing unit that writes a data block including a piece of the video data and the frame number corresponding thereto in a frame memory for every frame; a reading unit that reads out the data block written in the frame memory in the order of frames; and a video freezing determination unit that generates an abnormality determination signal that indicates video freezing when a current value of the frame number of the data block read by the reading unit stays the same as a previous value over a prescribed number of times.

According to the video processing device, the video freezing determination method, and the display system of the present invention, it is possible to reliably detect video freezing caused by a failure of the video processing device.

DETAILED DESCRIPTION OF EMBODIMENTS

Below, embodiments of the present invention will be explained in detail with reference to figures.

Embodiment 1

Figure 1:
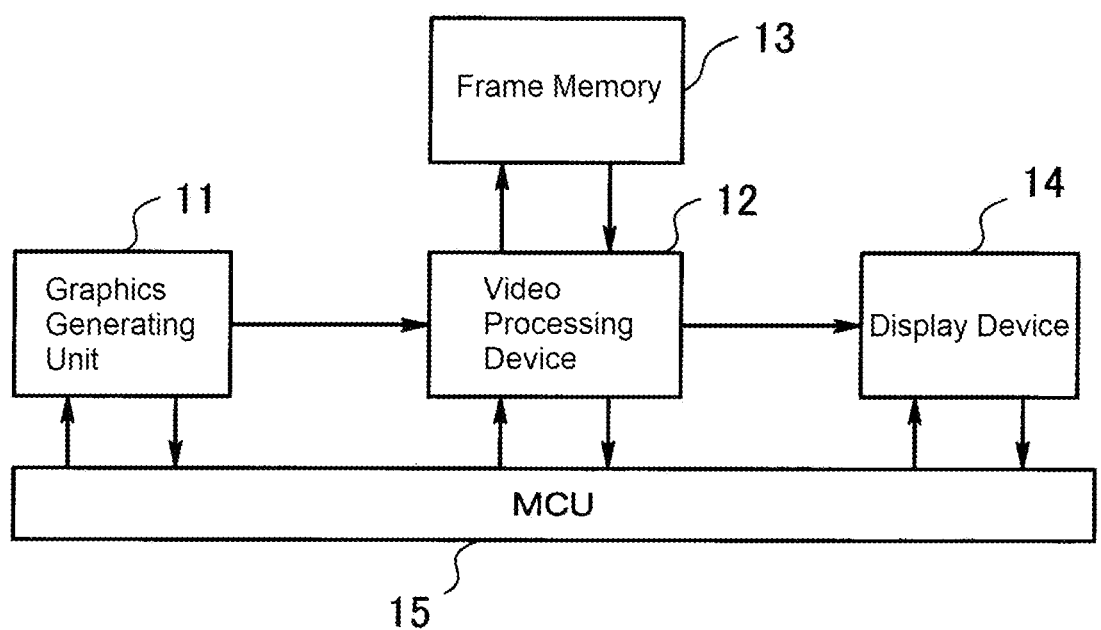
FIG. 1 is a block diagram illustrating a configuration of a display system of Embodiment 1 of the present invention.

FIG. 1 illustrates a configuration of a display system of Embodiment 1 of the present invention. This display system is a display system installed, for example, in a vehicle, and includes a graphics generating unit 11, a video processing device 12, a frame memory 13, a display device 14, and an MCU (micro-controller unit) 15.

The graphics generating unit 11 is connected to the video processing device 12. The video processing device 12 is connected to each of the frame memory 13 and the display device 14. The MCU 15 is connected to the graphics generating unit 11, the video processing device 12, and the display device 14.

The graphics generating unit 11 generates video data for displaying navigation information and the like required to drive a vehicle through graphical representation. The video processing device 12 is constituted of an LSI (large-scale integration) device. The video processing device 12 accepts video data successively from the graphics generating unit 11, writes data blocks including the video data into the frame memory 13, and reads the written data blocks out successively. The video processing device 12 is capable of changing the reading frequency relative to the writing frequency. The frame memory 13 is constituted of a RAM (random access memory) having a plurality of storage areas to store data blocks including video data for a plurality of frames. As described below, a data block includes video data, and a frame number for the video data.

The display device 14 is a device that includes a display (not shown in the figure), and that drives the display in accordance with video signals supplied from the video processing device 12 to show images represented by the video signals in the display. The MCU 15 is a control unit that controls the entire display system. The MCU 15 controls start/stop of the operations of the display system, operation timings of the respective units 11, 12, and 14, and the like.

Figure 2:
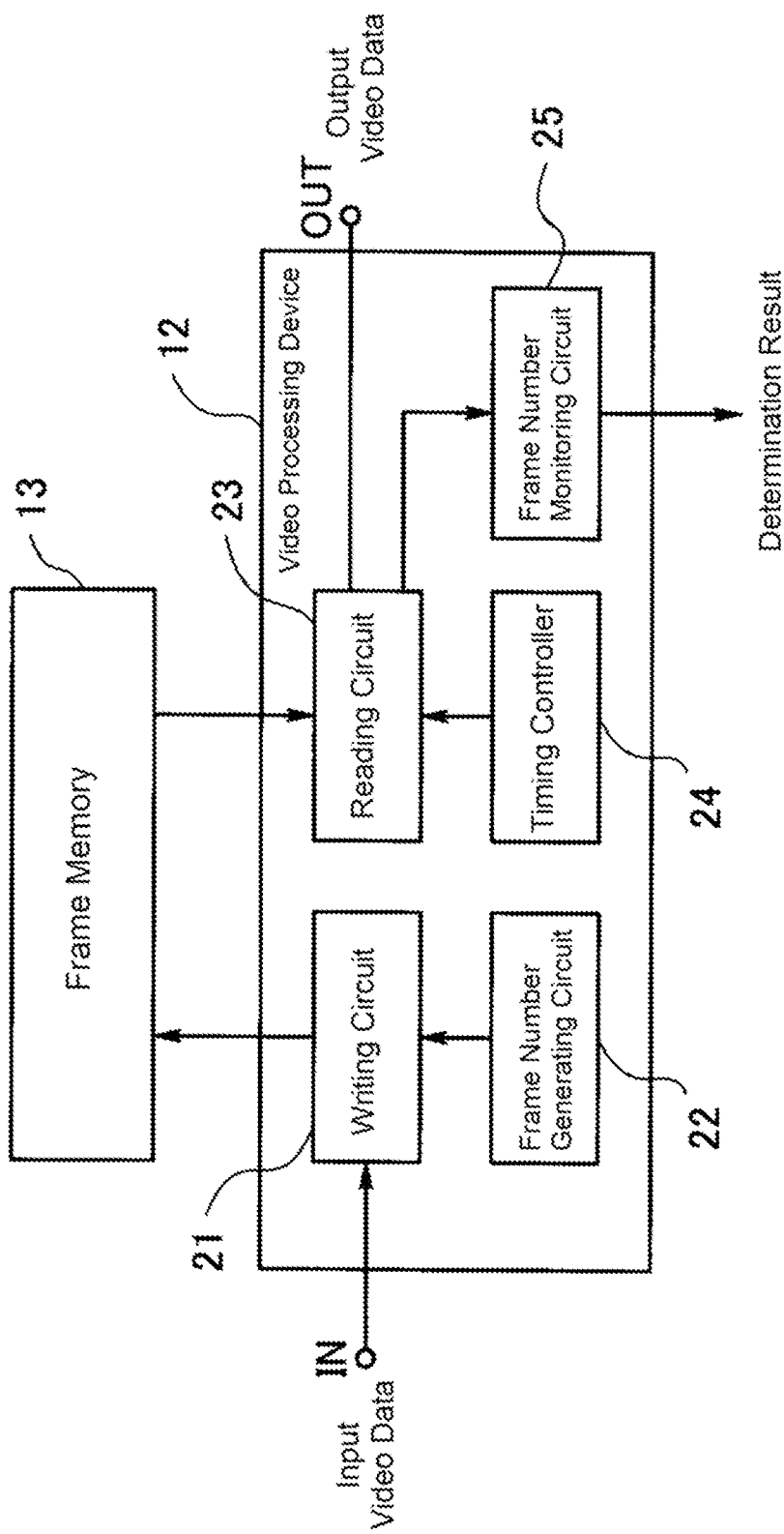
FIG. 2 is a block diagram illustrating an internal configuration of a video processing device in the system of FIG. 1.

FIG. 2 illustrates the internal configuration of the video processing device 12. As illustrated in FIG. 2, the video processing device 12 includes a writing circuit 21, a frame number generating circuit 22, a reading circuit 23, a timing controller 24 and a frame number monitoring circuit 25.

The writing circuit 21 is connected to an input terminal IN and the frame memory 13 of the video processing device 12, constituting a writing unit that writes data blocks including video data supplied from the graphics generating unit 11 into the frame memory 13 successively. The frame number generating circuit 22 that constitutes a frame number generating unit is connected to the writing circuit 21, and generates a frame number to be added to video data in a data block written by the writing circuit 21. The same frame number is given to video data of the same frame, and a frame number is increased by 1 when given to video data of the next frame.

The reading circuit 23 is connected to an output terminal OUT of the video processing device 12, the frame memory 13, the timing controller 24, and the frame number monitoring circuit 25, constituting a reading unit that successively reads out data blocks from the frame memory 13. The timing controller 24 controls a timing at which the reading circuit 23 reads out a data block to be read. Also, the reading circuit 23 outputs video data in the data block that has been read out to the display device 14 via the output terminal OUT of the video processing device 12, and supplies the frame number of the data block to the frame number monitoring circuit 25.

The frame number monitoring circuit 25 constitutes a video freezing determination unit, monitoring the frame numbers supplied from the reading circuit 23 and generating a normalcy determination signal if the frame numbers are changing in a prescribed manner. On the other hand, if the frame numbers do not change in a prescribed manner, the frame number monitoring circuit 25 generates an abnormality determination signal indicating frame freezing, instead of a normalcy determination signal. The normalcy determination signal and the abnormality determination signal generated by the frame number monitoring circuit 25 are supplied to the MCU 15.

In the display system having this configuration, video data is supplied from the graphics generating unit 11 to the writing circuit 21 of the video processing device 12 in one data block at a time. For example, if the video signal is configured to have 1920×1080 pixels in one frame as shown in FIG. 3, video data in one data block is 16 bits×64 pixels, and the number of pieces of video data included in one frame is 32400.

Figure 3:
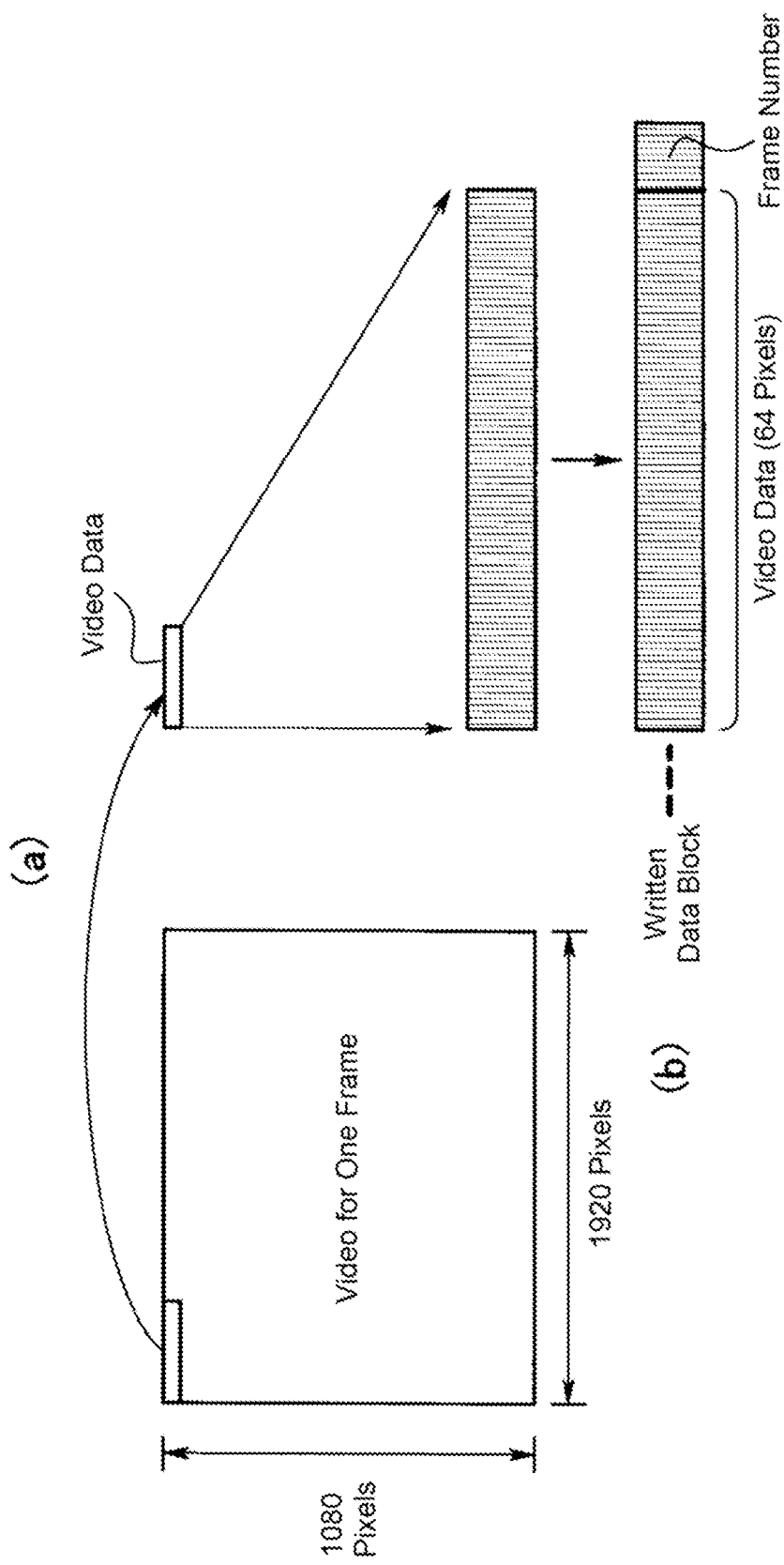
FIG. 3 is a diagram illustrating a configuration of a data block used for writing and reading in the video processing device of FIG. 2.

As illustrated in FIG. 3, the writing circuit 21 forms a data block by adding a frame number supplied from the frame number generating circuit 22 to the video data. The frame number is a number that is increased one by one every time one frame of the video signal changes to a next frame, and is 8-bit, for example. The respective data blocks in the same frame are given the same frame number. The data blocks provided with a frame number are written in the frame memory 13.

After the data blocks for one frame are written in one storage area of the frame memory 13 in this manner, data blocks for the next frame are written into another storage area of the frame memory 13. On the other hand, the data blocks for one frame that have been written in one storage area of the frame memory 13 are successively read out by the reading circuit 23 one block at a time. The video data in the data block that has been read out is outputted to the display device 14, and the frame number of the data block is supplied to the frame number monitoring circuit 25. The frame number monitoring circuit 25 determines whether a change in frame numbers is normal or abnormal based on the frame numbers successively supplied. That is, in a normal state, a plurality of pieces of video data having different frame numbers for the respective frame periods of the video signal are successively read out, and in an abnormal state, a plurality of pieces of video data having the same frame number for the same frame is repeatedly read out over a plurality of frames of the video signal.

Next, the operation of the frame number monitoring circuit 25 when frame rate conversion is not performed will be described. That is, the writing frequency for the frame memory 13 is identical to and synchronized with the reading frequency. Specifically, in this example, the frame rate for writing and the frame rate for reading are both 30 fps.

Figure 4:
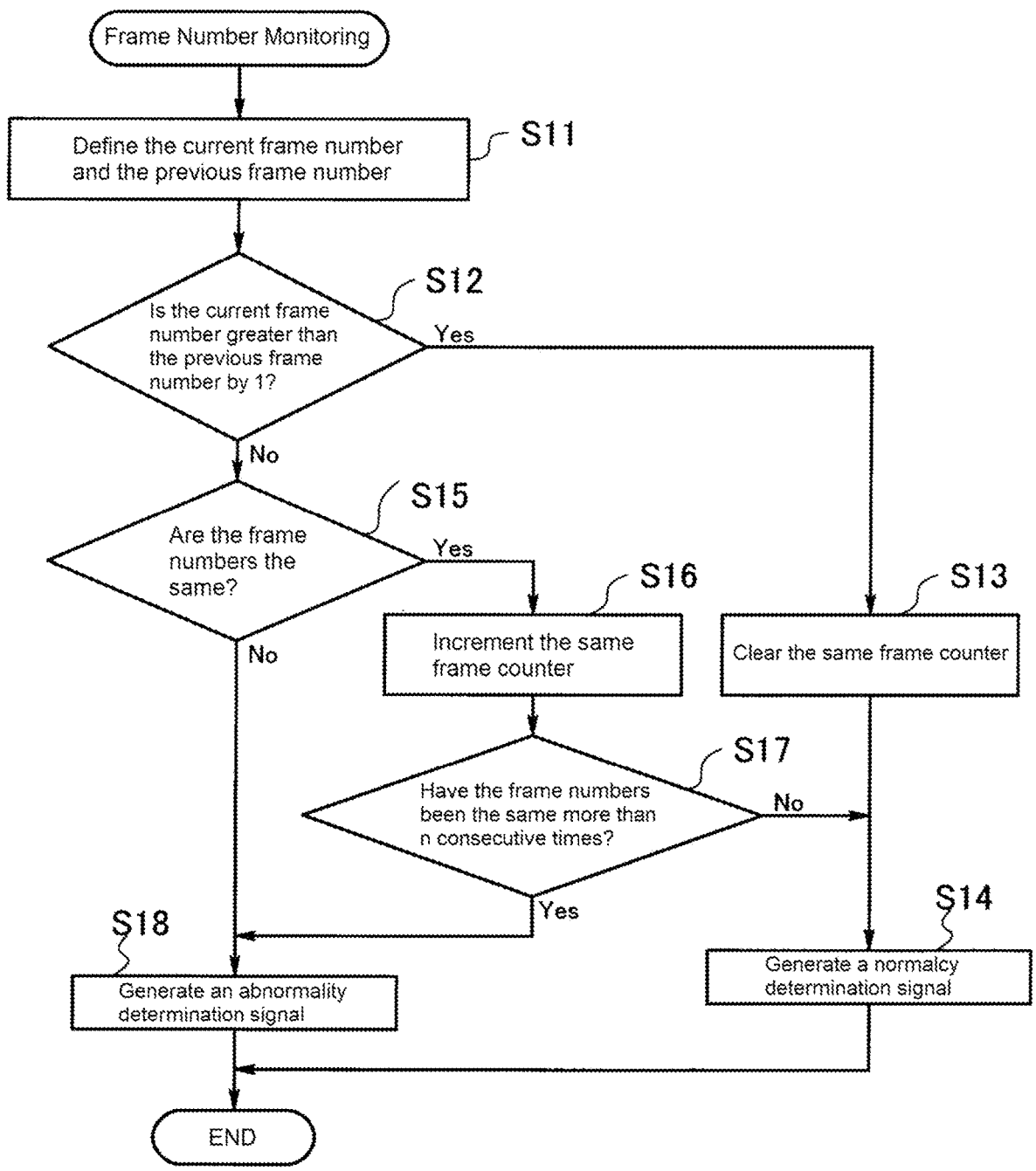
FIG. 4 is a flowchart illustrating an operation of a frame number monitoring circuit in the device of FIG. 2 when frame rate conversion is not performed.

In the frame number monitoring circuit 25, as illustrated in FIG. 4, every time a frame number is supplied from the reading circuit 23, that frame number becomes the current frame number, and the current frame number from the previous reading becomes the previous frame number (Step S11). Then the frame number monitoring circuit 25 determines whether the current frame number is greater than the previous frame number by 1 or not.

If the data blocks from the same frame are repeatedly read out, the difference between the current frame number and the previous frame number is 0. If the current frame number is greater than the previous frame number by 1, the frame number monitoring circuit 25 clears the same frame counter (not shown in the figure) (Step S13), and generates a normalcy determination signal that indicates the frame of the video data has changed to the next frame normally. The same frame counter is a counter that increments by 1, and may be constituted of hardware or software, for example.

On the other hand, if the current frame number is not greater than the previous frame number by 1, this means that the video data of the same frame might have been read out again, and thus, the frame number monitoring circuit 25 determines whether the current frame number is the same as the previous frame number or not (Step S15). If both are the same frame number, the frame number monitoring circuit 25 increments the same frame counter (Step S16), and determines whether or not the number of times the same frame number is detected is equal to or greater than n (Step S17). Here, n is a positive integer, and represents the number of pieces of video data constituting one frame. If the video data constituting one frame has a plurality of pieces, n is 2 or greater. When the writing frequency and the reading frequency are the same, if writing/reading is normally performed, the video data of the same frame is repeatedly read out "n−1" times, which is one minus n (the number of pieces of video data constituting one frame), and the video data read out next should have the next frame number. Thus, the integer n is set as a threshold value. However, taking tolerance into consideration, the integer n may be slightly greater than the number of pieces of video data constituting one frame.

If, as a result of the determination of Step S17, the number of times the same frame number is supplied is deemed smaller than n based on the counter value of the same frame counter, this can simply means that the video data of the same frame is successively read out, instead of frame freezing, and thus the frame number monitoring circuit 25 proceeds to Step S14 and generates the normalcy determination signal. However, if the same frame number is repeatedly supplied n times or more, the frame number monitoring circuit 25 generates an abnormality determination signal indicating that frame or the video is frozen (Step S18).

Also, in S15, if the current frame number is not the same as the previous frame number, Step S18 is immediately performed to generate an abnormality determination signal.

When the frame number monitoring circuit 25 generates the abnormality determination signal after Step 15, the abnormality determination signal is supplied to the MCU 15. In response to the abnormality determination signal, the MCU 15 pauses the respective operations of the graphics generating unit 11, the video processing device 12, and the display device 14.

As described above, according to the video processing device of Embodiment 1, the same frame number is given to the video data of the same frame when the video data is written in the frame memory 13, and the frame number is increased by 1 when the video data of the next frame is written. In the frame memory 13, data blocks each including video data and a frame number are temporarily written, and then, the data blocks for one frame are read out from the frame memory successively, starting from the data block that was written first. If the frame number of the data block that is newly read out is not increased by 1 from the frame number of the data block that was previously read out, and the same frame number is continuously supplied n times or more, then an abnormality determination signal is generated to indicate a video freezing state where the video data of the same frame is continuously supplied beyond one frame. This way, it is possible to reliably detect video freezing caused by a failure of the video processing device.

Figure 5:
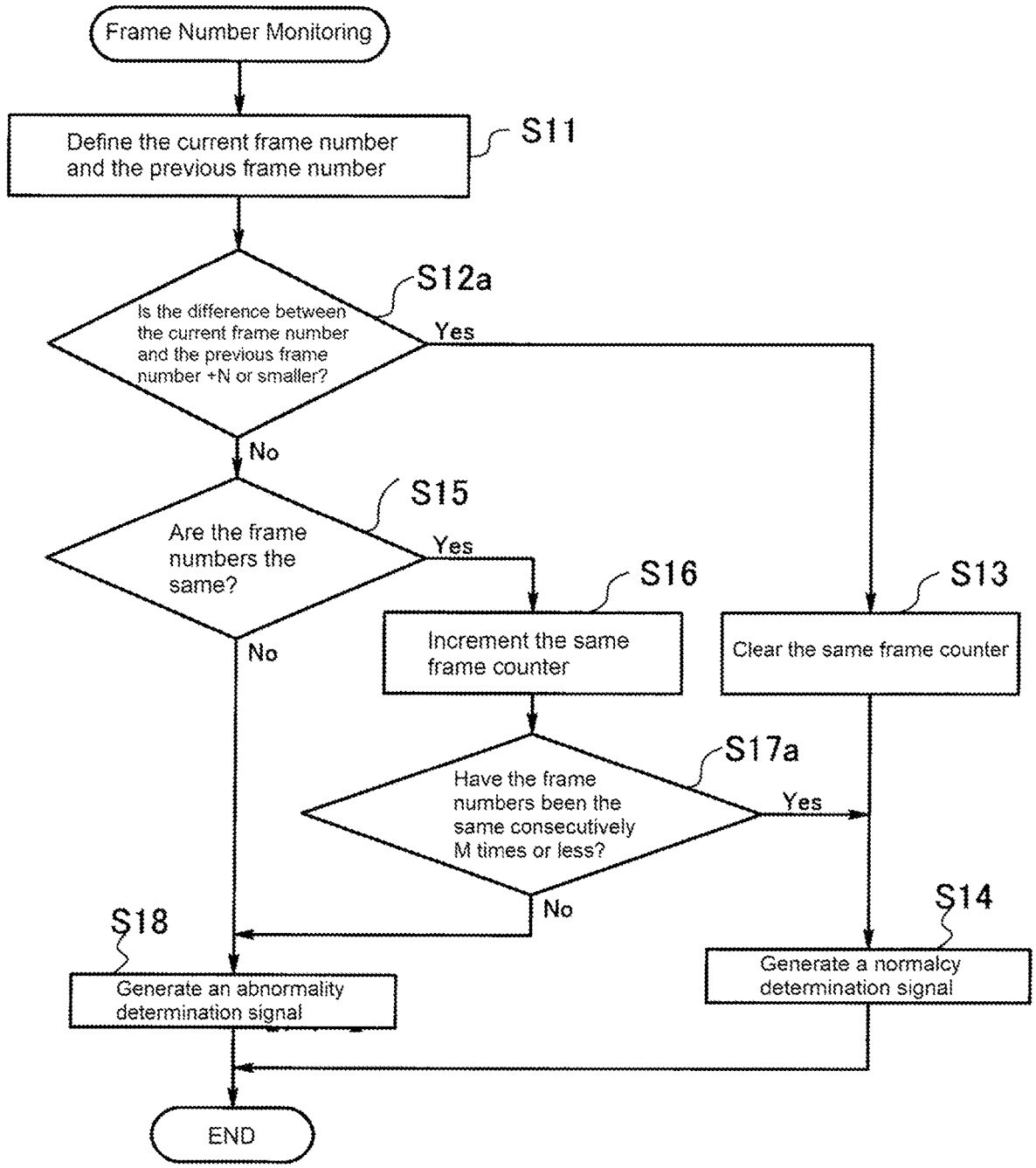
FIG. 5 is a flowchart illustrating an operation of a frame number monitoring circuit in the device of FIG. 2 when frame rate conversion is performed.

On the other hand, when the frame rate conversion is performed, the writing frequency for the frame memory 13 is not identical to the reading frequency, and thus, the frame number monitoring circuit 25 operates in a manner illustrated in FIG. 5. In the operation of FIG. 5, in addition to Steps S12 and S17 of FIG. 4, the frame number monitoring circuit 25 determines whether the difference between the current frame number and the previous frame number does not exceed N (Step S12a), and whether or not the number of times the same frame number is supplied does not exceed M (Step S17a). If the difference between the current frame number and the previous frame number exceeds N, and the number of times the same frame number is supplied exceeds M, then an abnormality determination signal is generated (Step S18). In this case, the values of N and M vary depending on the frame rate conversion. N is a positive integer, and represents the size of a normal change experienced by the frame number of the data blocks read out by the reading circuit 23. When every frame is read out without skipping and the frame number is increased by 1, N is 1, and when the data blocks are read out every other frame, N is 2. M is a value that is 1 less than the number of times data blocks from the same frame is to be read out by the reading circuit 23 upon frame rate conversion, or a value obtained by adding tolerance to the value that is 1 less than the number of times the same frame is to be read out.

In an asynchronous operation in which the writing frequency for the frame memory 13 is smaller than the reading frequency, or more specifically, for example, when the writing frame rate is 30 fps and the reading frame rate is 60 fps, the data blocks of each frame are repeatedly read out from the frame memory 13 two times. Thus, in the frame number monitoring circuit 25, if the state where the current frame number is not greater than the previous frame number by 1, or in other words, the state where the difference between the two is 0, continues 2n number of times (that is, exceeding M), for example, an abnormality determination signal is generated.

As described above, when the reading frame rate is m-times greater than the writing frame rate (m is an integer of 2 or greater), the data blocks of each frame are repeatedly read out from the frame memory 13 m-times. Thus, in the frame number monitoring circuit 25, if the state where the current frame number is not "+N=+1", or in other words, the state where the difference between the two is 0 continues more than M times, an abnormality determination signal is generated.

On the other hand, in an asynchronous operation in which the writing frequency for the frame memory 13 is greater than the reading frequency, or more specifically, for example, when the writing frame rate is 30 fps and the reading frame rate is 15 fps, the data blocks of every other frame are read out from the frame memory 13. Thus, in the frame number monitoring circuit 25, if the state where the current frame number is not greater than the previous frame number by 2, or in other words, the state where the difference between the two is 0 or +1 continues n(=M+1) times or more, an abnormality determination signal is generated.

As described above, when the reading frame rate is 1/m the writing frame rate, the data blocks of respective frames are read out, skipping "m−1" frames. Thus, in the frame number monitoring circuit 25, if the state when the current frame number is not "+N=+m", or in other words, the state where the difference between the two is 0, +1, . . . , or (+m−1) continues more than M times, an abnormality determination signal is generated.

When the writing frame rate is 30 fps and the reading frame rate is 10 fps, for example, the data blocks of respective frames are read out from the frame memory 13, skipping every two frames. In the frame number monitoring circuit 25, if the difference between the current frame number and the previous frame number is anything but +1, +2, or +3, an abnormality determination signal is generated. When the writing frame rate is 240 fps (highspeed display signal) and the reading frame rate is 60 fps, for example, if the difference between the current frame number and the previous frame number is anything but +1, +2, +3, +4, or +5, an abnormality determination signal is generated.

In this way, even when the writing frequency for the frame memory 13 is not the same as the reading frequency, by appropriately setting a threshold value for the abnormality determination, video freezing due to a failure of the video processing device can be reliably detected.

Embodiment 2

Figure 6:
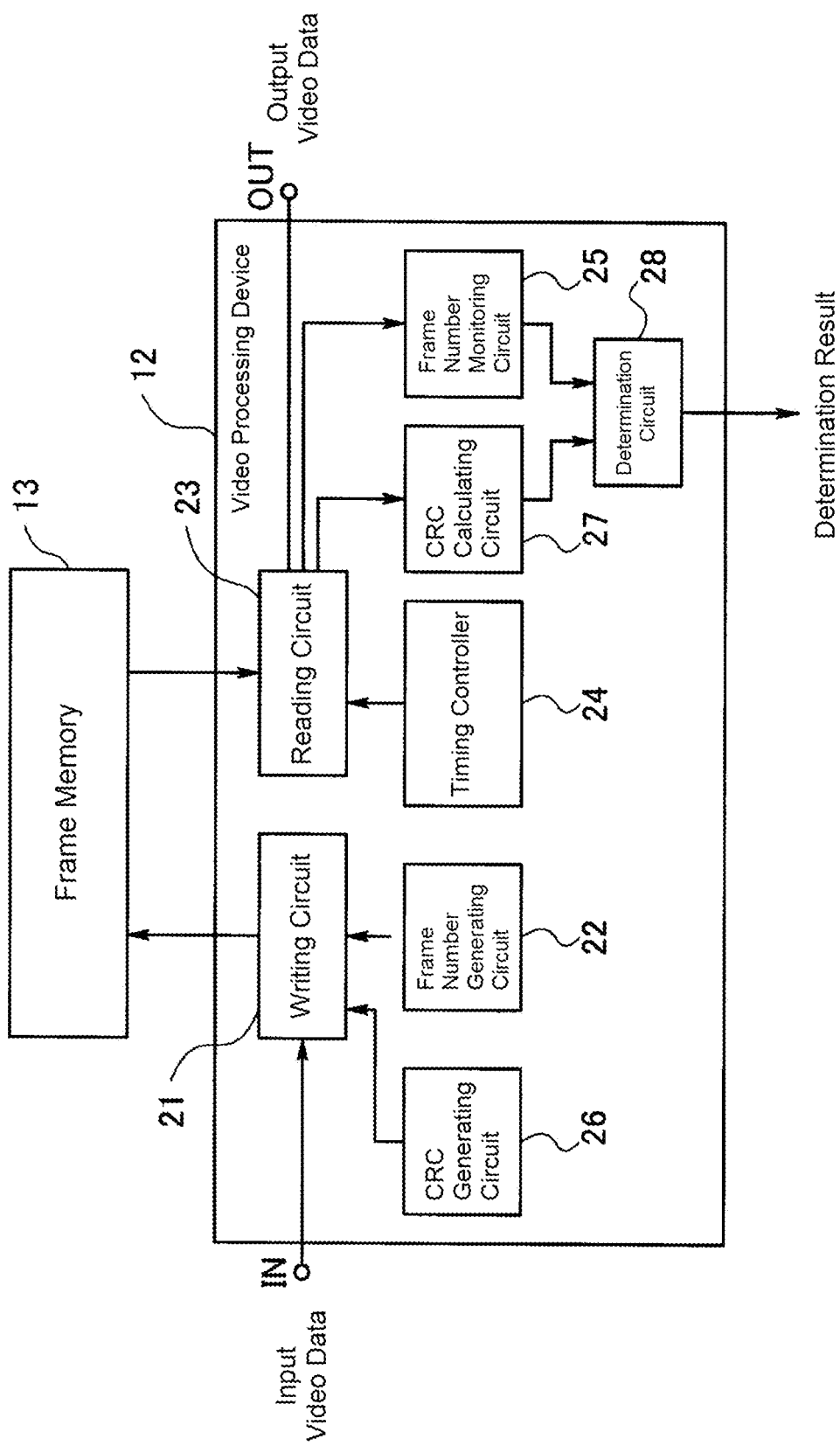
FIG. 6 is a block diagram illustrating another internal configuration of a video processing circuit in the system of FIG. 1 as Embodiment 2 of the present invention.

FIG. 6 illustrates another internal configuration of the video processing device 12 as Embodiment 2. As illustrated in FIG. 6, the video processing device 12 includes a CRC (cyclic redundancy check) generating circuit 26, a CRC calculating circuit 27, and a determination circuit 28, in addition to the writing circuit 21, the frame number generating circuit 22, the reading circuit 23, the timing controller 24 and the frame number monitoring circuit 25. The writing unit includes the CRC generating circuit 26 together with the writing circuit 21. The freezing determination unit is constituted of the frame number monitoring circuit 25, the CRC calculating circuit 27, and the determination circuit 28.

The CRC generating circuit 26 is connected to the writing circuit 21 and the frame number generating circuit 22, acquires the video data and the write-in coordinates of the data block to be written in the frame memory 13, acquires the frame number from the frame number generating circuit 22, and calculates a CRC value based on the video data, the write-in coordinates, and the frame number (video data+write-in coordinates+frame number).

Figure 7:
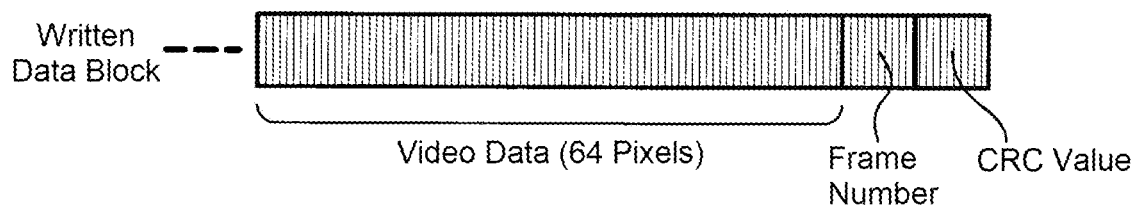
FIG. 7 is a diagram illustrating a configuration of a data block used for writing and reading in the video processing device of FIG. 6.

As illustrated in FIG. 7, the writing circuit 21 forms a data block by adding a frame number supplied from the frame number generating circuit 22 and the CRC value generated by the CRC generating circuit 26 to the video data supplied from the graphics generating unit 11. The data blocks having this configuration are written in the frame memory 13.

The reading circuit 23 is connected to the frame number monitoring circuit 25, the CRC calculating circuit 27, and the determination circuit 28. The reading circuit 23 successively reads out data blocks from the frame memory 13, outputs video data of the data block that has been read out to the display device 14 via the output terminal OUT of the video processing device 12, supplies the frame number of the data block to the frame number monitoring circuit 25, and supplies the CRC value to the CRC calculating circuit 27. The CRC calculating circuit 27 also receives other information such as the video data, read-out coordinates, and frame number for CRC calculation, in addition to the CRC value.

The frame number monitoring circuit 25 is the same as the frame number monitoring circuit 25 of Embodiment 1 described above, and determines whether a change in frame numbers is normal or abnormal based on the frame numbers successively supplied from the reading circuit 23.

The CRC calculating circuit 27 performs a CRC calculation based on the CRC values successively supplied from the reading circuit 23, and determines whether a result of the CRC calculation is normal or abnormal based on the video data, write-in (or read-out) coordinates, and frame number. If the CRC calculation result matches the video data+write-in (or read-out) coordinates+frame number, it is normal, and if the CRC calculation result does not match the video data+write-in (or read-out) coordinates+frame number, it is abnormal.

The determination circuit 28 is connected to the frame number monitoring circuit 25 and the CRC calculating circuit 27, and generates an abnormality determination signal if the frame number monitoring circuit 25 detects an abnormal frame change, and the CRC calculating circuit 27 detects an abnormal CRC calculation result P consecutive times or more (P is an integer of 1 or greater). The determination circuit 28 otherwise generates a normalcy determination signal. When the abnormality determination signal is supplied to the MCU 15, the MCU 15 pauses the respective operations of the graphics generating unit 11, the video processing device 12, and the display device 14 in response to the abnormality determination signal.

As described above, according to the video processing device of Embodiment 2, a CRC value is added to each piece of the video data written in the frame memory 13 in addition to the frame number described in Embodiment 1. In the frame memory 13, data blocks each including video data, a frame number, and a CRC value are temporarily written, and then, those data blocks for one frame are read out from the frame memory successively, starting from the data block that was written first. When the frame rate conversion is not performed, for example, if the frame number of the data block that was newly read out is not increased by 1 from the frame number of the data block that was previously read out "n" consecutive times, and the CRC calculation result based on the CRC value is deemed abnormal, an abnormality determination signal is generated to indicate a video freezing state where the video data of the same frame is continuously supplied beyond one frame. This way, it is possible to more reliably detect video freezing caused by a failure of the video processing device.

In each embodiment described above, the frame numbers generated by the frame number generating circuit 22 increase successively, but instead, the frame numbers may decrease successively. Also, the frame number is increased by 1 as video frame moves up to the next frame, but the frame number may be increased by a different number instead of 1.

Furthermore, as illustrated in FIG. 1, the graphics generating unit 11 was used for the video source in each embodiment, but it is needless to say that another video source such as a camera may be used in the present invention.

DESCRIPTION OF REFERENCE CHARACTERS

11 Graphics Generating Unit
12 Video Processing Device
13 Frame Memory
14 Display Device
15 MCU
21 Writing Circuit
22 Frame Number Generating Circuit
23 Reading Circuit
24 Timing Controller
25 Frame Number Monitoring Circuit
26 CRC generating Circuit
27 CRC Calculating Circuit
28 Determination Circuit

What is claimed is:

1. A video processing device, comprising:
a frame number generating unit that generates frame numbers representing respective frames to which successively supplied video data belongs, the frame numbers differing between one frame and a next frame;
a writing unit that writes a data block including a piece of the video data and a frame number in a frame memory for every frame of the respective frames;
a reading unit that reads out the data block written in the frame memory in an order of the respective frames; and
a video freezing determination unit that generates an abnormality determination signal that indicates video freezing when a current value of the frame number of the data block read out by the reading unit stays the same as a previous value over a prescribed number of times of reading out the data block written in the frame memory.

2. The video processing device according to claim 1, wherein frame numbers generated by the frame number generating unit are configured such that, between two consecutive frames, a frame number of a latter frame is greater than a frame number of a former frame by 1.

3. The video processing device according to claim 2, wherein, when one frame is constituted of n-number of pieces of video data (n is an integer of 1 or greater) and a writing frequency by the writing unit for the frame memory and a reading frequency by the reading unit are the same, the prescribed number of times is set to a value n or greater.

4. The video processing device according to claim 2, wherein, when one frame is constituted of n-number of pieces of video data (n is an integer of 1 or greater) and a reading frequency by the reading unit is m-times larger (m is an integer of 2 or greater) than a writing frequency by the writing unit for the frame memory, the prescribed number of times is set to a value of m×n or greater.

5. The video processing device according to claim 2, wherein, when one frame is constituted of n-number of pieces of video data (n is an integer of 1 or greater) and a reading frequency by the reading unit is m-times smaller (m is an integer of 2 or greater) than a writing frequency by the writing unit to the frame memory, the prescribed number of times is set to a value of n or greater, and
wherein the video freezing determination unit generates the abnormality determination signal when a state in which the current value of the frame number of the data block read out by the reading unit is not increased by m from the previous value includes a state where the current value stays the same as the previous value that continues beyond the prescribed number of times.

6. The video processing device according to claim 1, wherein the writing unit includes a CRC (cyclic redundancy check) generating unit that generates a CRC value based on the video data, write-in coordinates of the frame memory, and the frame number,
wherein the writing unit writes the data block including the piece of video data, the frame number, and the CRC value into the frame memory for every frame of the respective frames,
wherein the reading unit obtains the piece of video data, the frame number, and the CRC value from the data block read out from the frame memory,
wherein the video freezing determination unit includes a CRC calculating unit that performs a CRC calculation based on the CRC value, and determines whether a result of the CRC calculation is normal or abnormal, and
wherein the video freezing determination unit generates the abnormality determination signal when a state in which the current value of the frame number of the data block read out by the reading unit stays the same as a previous value continues beyond the prescribed number of times, and the CRC calculating unit detects abnormality.

7. A video freezing determination method for a video processing device, comprising:
a step in which a frame number generating unit generates frame numbers representing respective frames to which successively supplied video data belongs, the frame numbers differing between one frame and a next frame;
a step in which a writing unit writes a data block including a piece of the video data and a frame number in a frame memory for every frame of the respective frames;
a step in which a reading unit reads out the data block written in the frame memory in an order of the respective frames; and
a step in which a freezing determination unit generates an abnormality determination signal that indicates video freezing when a current value of the frame number of the data block read out by the reading unit stays the same as a previous value over a prescribed number of times of reading out the data block written in the frame memory.

8. A display system, comprising:
a video processing device that writes video data successively outputted from a video source into a frame memory, and reads out the written video data from the frame memory; and
a display device that presents a video based on the video data read out from the frame memory in a display,
wherein the video processing device comprises:
a frame number generating unit that generates frame numbers representing respective frames to which successively supplied video data belongs, the frame numbers differing from one frame and a next frame;
a writing unit that writes a data block including a piece of the video data and a frame number in a frame memory for every frame of the respective frames;
a reading unit that reads out the data block written in the frame memory in an order of the respective frames; and
a video freezing determination unit that generates an abnormality determination signal that indicates video freezing when a current value of the frame number of the data block read out by the reading unit stays the same as a previous value over a prescribed number of times of reading out the data block written in the frame memory.

9. The display system according to claim 8, further comprising a control unit that pauses the video source, the video processing device, and the display device in response to the abnormality determination signal.

* * * * *